United States Patent [19]

Carvalho

[11] Patent Number: 4,693,672

[45] Date of Patent: Sep. 15, 1987

[54] TWO LEVEL OIL DAM

[75] Inventor: Paul A. Carvalho, Westfield, Mass.

[73] Assignee: United Technologies Corporation, Hartford, Conn.

[21] Appl. No.: 925,050

[22] Filed: Oct. 30, 1986

[51] Int. Cl.⁴ ...................... B64C 11/30; F01M 11/00
[52] U.S. Cl. .............................. 416/174; 416/146 A; 184/6.11; 184/6.27; 184/80
[58] Field of Search ........... 416/174 C, 174 R, 174 A, 416/146 A, 170 R; 184/6.2, 6.4, 6.11, 6.27, 80, 103.1; 415/175

[56] References Cited

U.S. PATENT DOCUMENTS

| | | | |
|---|---|---|---|
| 2,687,279 | 8/1954 | Ljungberg | 416/174 A |
| 2,712,967 | 7/1955 | Sutton | 184/6.11 X |
| 3,341,173 | 9/1967 | Garrett | 415/175 |
| 3,394,875 | 7/1968 | Hasa et al. | 415/175 |
| 3,621,937 | 11/1971 | Edge et al. | 184/6.11 X |
| 3,794,440 | 2/1974 | McMurtry | 416/174 A |
| 3,847,248 | 11/1974 | Avery | 184/6.11 X |
| 3,912,418 | 10/1975 | Andrews et al. | 416/174 A |
| 4,271,928 | 6/1981 | Northern | 184/6.4 |
| 4,456,425 | 6/1984 | McCarty et al. | 416/170 R |

FOREIGN PATENT DOCUMENTS

| | | | |
|---|---|---|---|
| 2325614 | 12/1973 | Fed. Rep. of Germany | 184/6.4 |
| 887287 | 11/1943 | France | 415/175 |
| 1061478 | 3/1967 | United Kingdom | 416/146 A |

Primary Examiner—Everette A. Powell, Jr.
Attorney, Agent, or Firm—Lloyd D. Doigan

[57] ABSTRACT

An oil dam consists of a pair of parallel plates, each plate having a hole passing therethrough, each hole being disposed at a radial position within each respective plate such that the oil may flow through the holes when the dam is rotating. The hole in one plate is offset circumferentially from the hole in the other plate so that both of the holes are not below a surface of the oil flow when the dam is in a stationary position.

6 Claims, 3 Drawing Figures

TWO LEVEL OIL DAM

DESCRIPTION

1. Technical Field

This invention relates to the drainage of oil from the central hub of a rotary machine. The concepts were developed for use with counter-rotating propeller systems, but have wider applicability as well.

2. Background Art

Typically, variable pitch aircraft propeller systems include: a plurality of propeller blades extending radially from a central hub (or hubs), an engine, a gearbox for transmitting the rotational output of the engine to the hub (or hubs), and a pitch actuation system housed within the hub that pivots the propeller blades about their longitudinal axes to vary the angle (pitch) of the blades with respect to the approaching airflow.

The propeller system requires constant lubrication and cooling during operation. Generally, oil is circulated throughout the system to provide such lubrication and cooling. The oil is injected continuously into the hub to lubricate the system components therein such as the pitch actuation system. The oil drains from the hub to the gearbox to minimize the combined weight of the oil and hub structure. The oil is then reinjected into the hub as it continues to circulate.

The amount of oil in the system is determined by measuring the oil level within the gearbox when the hub is not rotating. However, since the oil tends to pool within the interior contours of the hub when the hub is not rotating and the angle of the stationary hub may vary depending on the angle of the surface on which the aircraft is parked, the amount of oil that remains in the hub is uncertain. Because the amount of oil in the hub is uncertain, measurement of oil in the system from the gearbox may be inaccurate. As a result of the inaccurate measurements, an operator may add too little or too much oil to the system. It is desirable to dam the oil within the hub when the hub is not rotating to trap a certain amount of oil therein, thereby obtaining a more accurate measurement of the oil within the system.

Presently, it is known in the art to insert a centrifugal check valve within the hub. The check valve allows the oil flow to drain from the hub while the hub is rotating and dam the oil flow within the hub while the hub is in a stationary position. The centrifugal check valve increases the complexity and cost of the hub.

Other techniques for allowing an oil flow to drain from a rotating hub and damming an oil flow within the hub in a stationary position are sought, and it is to this end that the present invention is directed.

DISCLOSURE OF INVENTION

According to the present invention, oil is drained from the central hub of a rotary machine across an oil dam having a first ring with one or more drain holes and a second ring with one or more drain holes spaced circumferentially from the holes of the first ring such that oil in the hub is centrifuged through both sets of holes during rotation of the hub, yet collects in the bottom of the hub at a level below one or both of the holes when the rotary machine is at rest.

A primary feature of the present invention is the relative positions of the holes of the first ring and of the holes of the second ring. The holes of each ring are spaced circumferentially apart from the holes of the other ring. In at least one embodiment the respective holes are positioned in a diametrically opposed relationship.

Spacing the sets of holes apart from each other causes oil to be blocked from flowing out of the hub by one or both of the rings when the hub is at rest, yet does not prevent oil from being centrifuged through both sets of holes during rotation of the hub.

Other features and advantages will be apparent from the specification and claims and from the accompanying drawings which illustrate an embodiment of the invention.

BEST MODE FOR CARRYING OUT THE INVENTION

Figure 1:
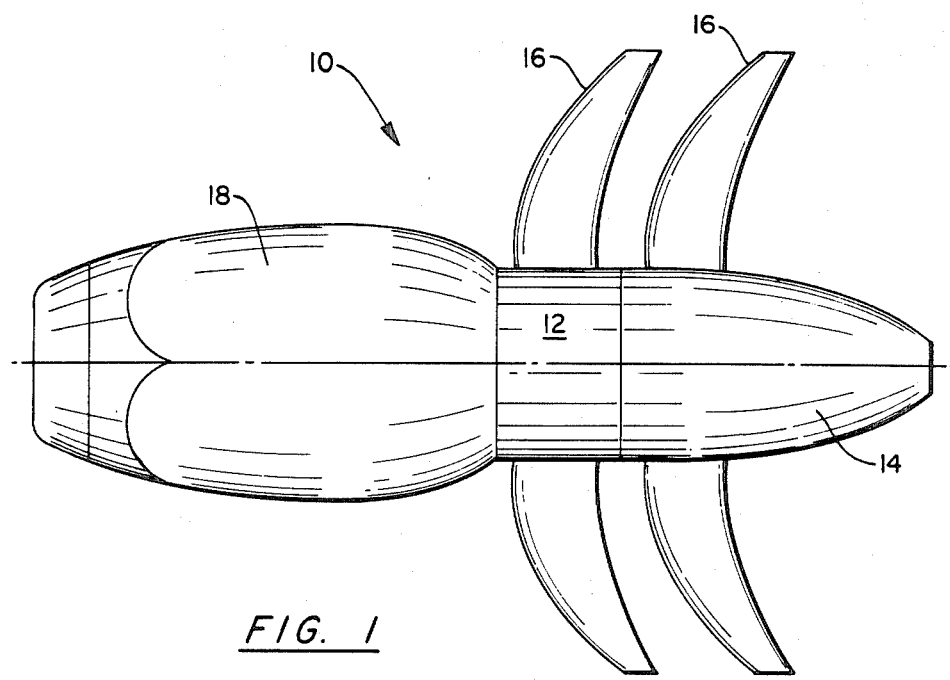
FIG. 1 is a schematic cross sectional view illustrating a prop fan propeller system.

This invention in its preferred form is described with respect to a counter-rotating prop fan embodiment currently being developed by Hamilton Standard Division of United Technologies Corporation. The counter-rotating prop fan 10 as shown in FIG. 1 comprises a forward hub 12 and an aft hub 14, each hub supporting a plurality of variable pitch fan blades 16. The hubs are driven by a turbine power plant (not shown) housed in a nacelle 18.

Figure 2:
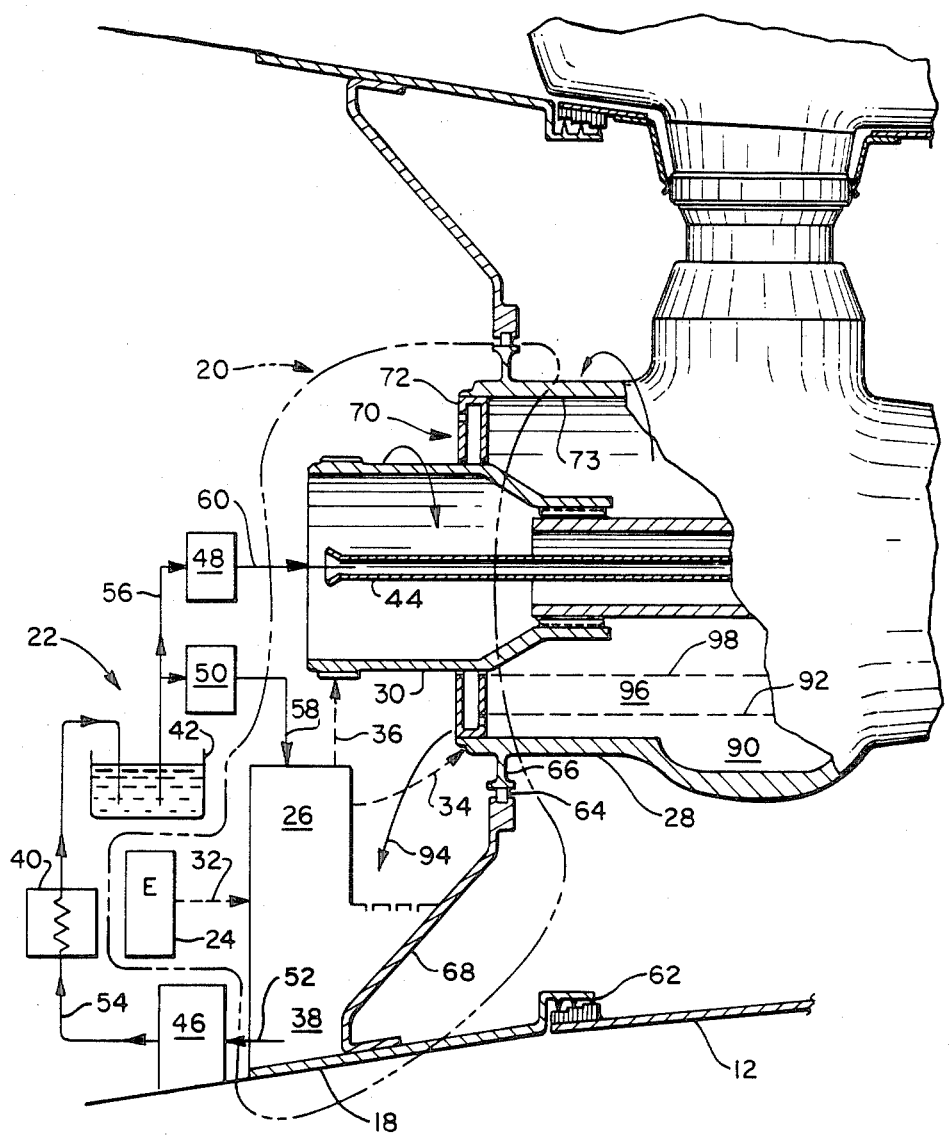
FIG. 2 is a partly schematic and partly sectional view of a portion of the hub and nacelle of FIG. 1.

Referring to FIG. 2, the details of a portion of the forward hub 12 and the nacelle 18 of the counter-rotating prop fan are shown. A drive system 20 and an oil system 22 are shown schematically.

The drive system 20 includes an engine 24, a gearbox 26, a hollow first shaft 28, and a hollow second shaft 30. The gearbox 26 transmits a rotational first output 32 from the engine 24 to provide a rotational second output 34 to drive the hollow first shaft 28 (i.e. "element") in a rotational direction and to provide a rotational third output 36 to drive the hollow second shaft 30 in a counter-rotational direction. The first shaft drives the forward hub 12. The second shaft is nested coaxially within the first shaft and drives the aft hub 14 (shown in FIG. 1).

The oil system 22 includes a sump 38 within the gearbox, a heat exchanger 40, a reservoir 42, an oil distribution line 44, three oil pumps 46, 48, 50 and a plurality of connecting lines. Line 52 provides a fluidic connection between pump 46 and the sump 38. Line 54, which passes through the heat exchanger 40, provides a fluidic connection between the reservoir 42 and the pump 46. Line 56 provides a fluidic connection between the pumps 48, 50 and the reservoir. Line 58 provides a fluidic connection between the gearbox 26 and pump 50 and line 60 provides a fluidic connection between the oil distribution line 44, which is disposed coaxially within said second shaft, and the pump 48. The forward hub 12 and nacelle 18 are sealed to prevent air leakage by an annular knife-edge seal 62 between the forward hub and the nacelle and to prevent oil leakage by an annular face seal 64 between a radial projection 66 on the first shaft and a bulkhead 68 depending radially inwardly from the nacelle. An oil dam 70 is mounted on an inner surface 73 of the first shaft 28 as will be discussed hereinafter.

Figure 3:
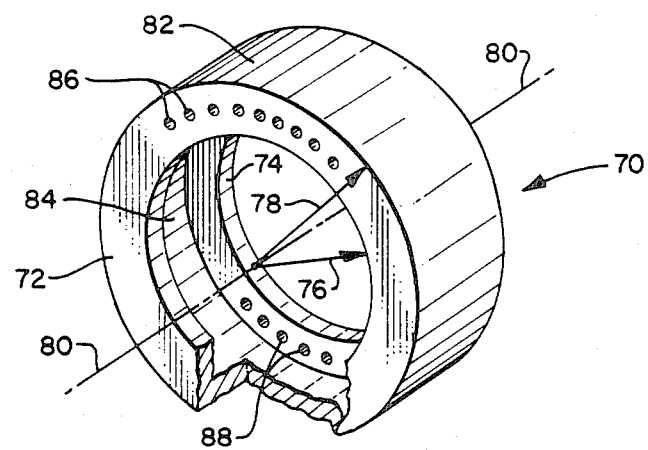
FIG. 3 is a perspective view partly in section of the oil dam of FIG. 2.

Referring to FIG. 3, the details of the oil dam 70 of the invention are shown. A flat first ring 72 (or "plate") and flat second ring (or "plate") 74 each have an inner radius 76 and an outer radius 78 extending from an axis 80 and are adjoined at their outer radii by a cylinder 82. The cylinder in conjunction with the rings forms a circumferential channel 84. The inner radius of each ring is designed to allow the second shaft 30 to pass therethrough without interference. The first ring 72 has a first plurality of holes 86 extending axially therethrough. The second ring 74 has a second plurality of holes 88 extending axially therethrough. The number of holes, the distance between each hole in each ring and the dimensions of each hole are chosen to ensure that the oil may flow freely from the first shaft during rotation and vary with the lubrication and heat flow requirements of the machinery in which the invention is installed. In the embodiment illustrated, the plurality of holes in the second ring are positioned diametrically opposite to the first plurality of holes in the first ring about axis 80 as will be discussed infra. The rings and the cylinder are typically formed of aluminum.

During operation, lubricating and cooling oil is drawn from the sump 38 by pump 46 via lines 52 and impelled via line 54 through the heat exchanger 40 into the reservoir 42. The oil is then drawn from the reservoir via line 56 by pumps 48, 50. Pump 50 impels the oil into the gearbox 26 for lubrication and cooling therein via line 58. Pump 48 impels the oil into the oil distribution line 44 via line 60 for distribution throughout the forward and aft hubs. Forces within the hubs tend to centrifuge the oil into a circumferential band 90 within the inner surface 73 of the first shaft 28. The height of a surface 92 of the centrifuged band of oil increases until the surface reaches the plurality of holes 86 in the first ring 72 of the oil dam 70.

Both sets of holes within the rings of the oil dam are designed to be radially inwardly the surface 92 of the oil flowing in the centrifuged band 90. The oil enters the dam through the first plurality of holes 86 in the first ring 72, migrates about the channel 84 created between the two rings and exits out the second plurality of holes 88 in the second ring 74 to drain into the sump 38 as shown schematically by line 94 in FIG. 2. In this manner, the oil flow may drain freely from the first shaft while the hub rotates. If the hubs are not rotating, the oil flow tends to form a pool 96 at the bottom of the first shaft 28. Because the holes of the second ring of the dam are spaced circumferentially from, and in this case diametrically opposite of the holes of the first ring, the oil circulates in the pool 96 and is effectively dammed from flowing into the sump. For instance, if the holes in the first ring are below the surface of the pool of oil, the oil will enter the channel between the two rings but will not exit from the dam because the holes for the second ring are above the surface 98 of the pool 96 of oil within the shaft. If the holes within the first ring are above the surface of the pool of oil, the oil cannot enter the channel to exit from the holes in the second ring.

Accordingly, a simple, inexpensive, and easy to maintain oil dam is provided that allows an oil flow to drain freely from a rotating shaft but prevents the oil flow from draining from the shaft when the shaft is not rotating.

What is claimed:

1. Apparatus for draining a centrifuged band of oil from a rotating propeller shaft and for damming a pool of oil if the propeller shaft is not rotating, comprising:
   first means for damming said pool of oil and having disposed therein a first draining means for draining said band, said first means for damming being mounted to said propeller shaft;
   second means for damming said pool of oil and having a second draining means for draining said band disposed therein, said second means for damming being mounted to said propeller shaft such that both of said first draining means and said second draining means are not below surface of said pool if said propeller shaft is not rotating.

2. Apparatus for draining a centrifugal band of oil from a rotating element and for damming a pool of oil if the element is not rotating, comprising:
   first means for damming said pool of oil and having disposed therein a first draining means for draining said band, said first means for damming being mounted to said element;
   second means for damming said pool of oil and having a second draining means for draining said band disposed therein, said second means for damming being mounted to said element such that both of said first draining means and said second draining means are not below a surface of said pool if said element is not rotating.

3. Apparatus of claim 2 wherein said first means for damming and said second means for damming are rings.

4. Apparatus of claim 3 wherein said first draining means and said second draining means are holes that are rotationally offset from each other.

5. Apparatus of claim 2 wherein said first means for damming and said second means for damming are mounted in series.

6. Apparatus for draining oil from a propeller shaft if said propeller shaft is rotating and for preventing the drainage of said oil if said propeller shaft is not rotating comprising: a first ring mounted to an interior surface of said propeller shaft, said plate having a first hole disposed therethrough at a radial position thereon such that oil may pass through said first hole when said shaft is rotating, and
   a second ring mounted parallel to said first circular ring on said interior surface such that a channel is formed between said rings and having a second hole disposed therethrough at a radial position thereon such that oil may pass through said second hole when said shaft is rotating, said second hole being rotationally spaced from said first hole such that one or both of said holes are above a level of said oil if said propeller shaft is not rotating.

* * * * *